United States Patent
Battré et al.

(10) Patent No.: US 9,160,613 B1
(45) Date of Patent: Oct. 13, 2015

(54) RANKING PLURAL COOKIES

(71) Applicant: GOOGLE INC., Mountain View, CA (US)

(72) Inventors: Dominic Pascal Battré, Munich (DE); Andrew Swerdlow, San Francisco, CA (US); Markus Heintz, Munich (DE)

(73) Assignee: Google Inc., Mountain View, CA (US)

( * ) Notice: Subject to any disclaimer, the term of this patent is extended or adjusted under 35 U.S.C. 154(b) by 200 days.

(21) Appl. No.: 13/772,284

(22) Filed: Feb. 20, 2013

(51) Int. Cl.
*H04L 12/24* (2006.01)
*H04L 29/08* (2006.01)
*H04L 12/865* (2013.01)

(52) U.S. Cl.
CPC .......... *H04L 41/00* (2013.01); *H04L 29/08621* (2013.01)

(58) Field of Classification Search
CPC ....................................................... H04L 41/00
USPC ....................................................... 709/224
See application file for complete search history.

(56) References Cited

U.S. PATENT DOCUMENTS

| | | | |
|---|---|---|---|
| 6,078,916 A * | 6/2000 | Culliss | 1/1 |
| 2006/0230265 A1* | 10/2006 | Krishna | 713/158 |
| 2008/0195588 A1* | 8/2008 | Kim et al. | 707/3 |
| 2008/0313336 A1* | 12/2008 | Porter et al. | 709/227 |
| 2009/0177644 A1* | 7/2009 | Martinez et al. | 707/5 |
| 2012/0124206 A1* | 5/2012 | Butler et al. | 709/224 |

* cited by examiner

*Primary Examiner* — Brian J Gillis
*Assistant Examiner* — Juan C Turriate Gastulo
(74) *Attorney, Agent, or Firm* — McDermott Will & Emery LLP

(57) ABSTRACT

A system and machine-implemented method for ranking cookies. A plurality of cookies associated with accessing web content is identified. For each cookie of the identified plurality of cookies, one or more attributes of the cookie are determined, and a weight is assigned to the cookie based on the determined one or more attributes of the cookie. The plurality of cookies are ranked relative to each other based on the their respective assigned weights.

20 Claims, 5 Drawing Sheets

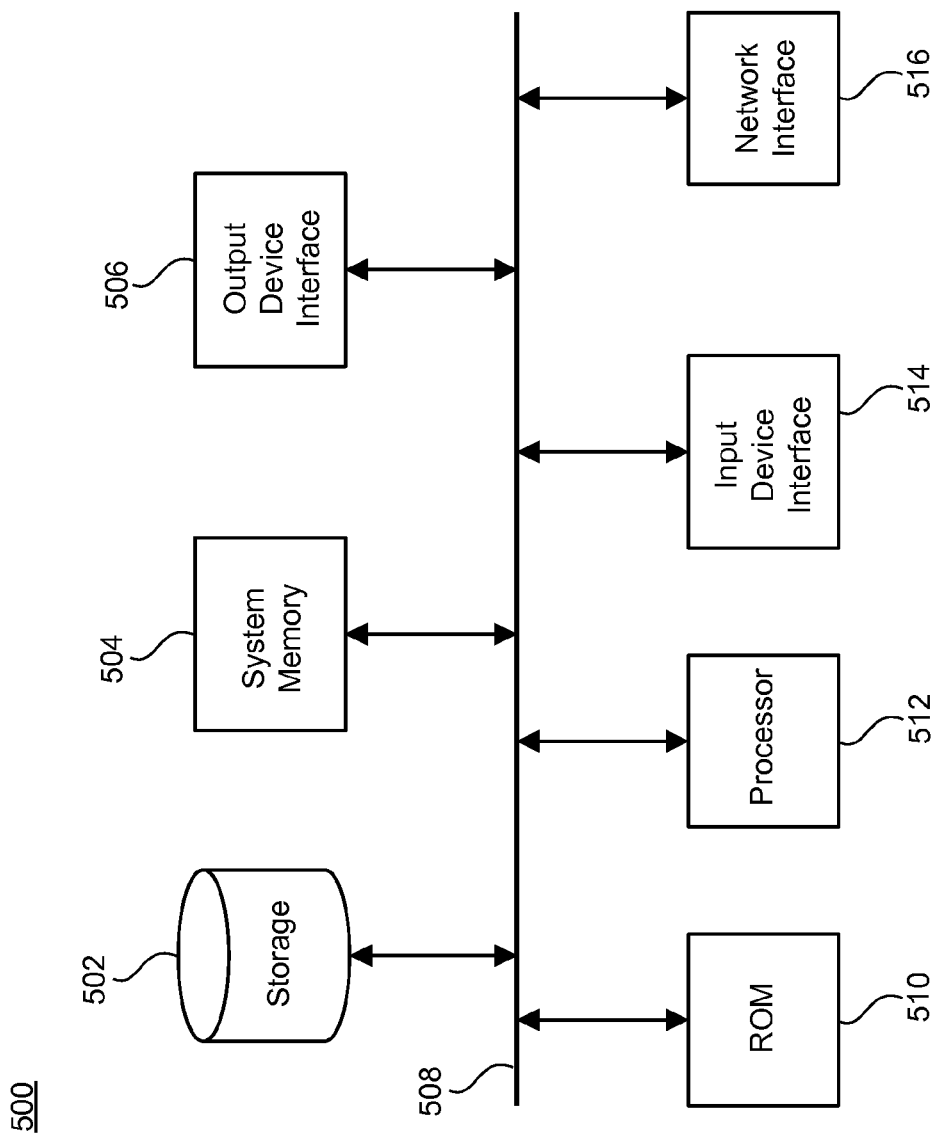

RANKING PLURAL COOKIES

BACKGROUND

The present disclosure generally relates to accessing web content and, in particular, to ranking plural cookies associated with accessing web content.

A cookie is a small piece of data sent from a website and stored in a user's web browser while a user is browsing a website. When the user browses the same website in the future, the data stored in the cookie can be retrieved by the website to notify the website of the user's previous activity. However, some users accessing web content may not understand how cookies work. These users may not understand what cookies are needed for their applications to work, or how often cookies are used.

SUMMARY

The disclosed subject matter relates to a machine-implemented method of ranking plural cookies. The method comprises identifying a plurality of cookies associated with accessing web content. The method further comprises, for each cookie of the identified plurality of cookies, determining one or more attributes of the cookie, and assigning a weight to the cookie based on the determined one or more attributes of the cookie. In addition, the method comprises ranking the plurality of cookies relative to each other based on the their respective assigned weights.

The disclosed subject matter further relates to a system for ranking plural cookies. The system comprises one or more processors, and a machine-readable medium comprising instructions stored therein, which when executed by the processors, cause the processors to perform operations comprising identifying a plurality of cookies associated with a user accessing web content. The operations further comprise, for each cookie of the identified plurality of cookies, determining one or more attributes of the cookie, and assigning a weight to the cookie based on the determined one or more attributes of the cookie. In addition, the operations comprise ranking the plurality of cookies relative to each other based on the their respective assigned weights.

The disclosed subject matter also relates to a machine-readable medium comprising instructions stored therein, which when executed by a system, cause the system to perform operations comprising identifying a plurality of cookies associated with a computing device accessing web content. The operations further comprise, for each cookie of the identified plurality of cookies, determining one or more attributes of the cookie, and assigning a weight to the cookie based on the determined one or more attributes of the cookie. In addition, the operations comprise ranking the plurality of cookies relative to each other based on the their respective assigned weights.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several embodiments of the subject technology are set forth in the following figures.

FIG. 5 conceptually illustrates an example electronic system with which some implementations of the subject technology can be implemented.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

As noted above, some users accessing web content may not understand how cookies work. These users may not understand what cookies are needed for their applications to work, or how often cookies are used. Thus, it may be desirable to prioritize cookies for users accessing web content.

The subject technology provides for ranking plural cookies. A plurality of cookies associated with accessing web content is identified. For each cookie of the identified plurality of cookies, one or more attributes of the cookie are determined, and a weight is assigned to the cookie based on the determined one or more attributes of the cookie. The plurality of cookies are ranked (e.g., with the higher-ranked cookies corresponding to those cookies which the user may need more awareness of) relative to each other based on the their respective assigned weights.

Figure 1:
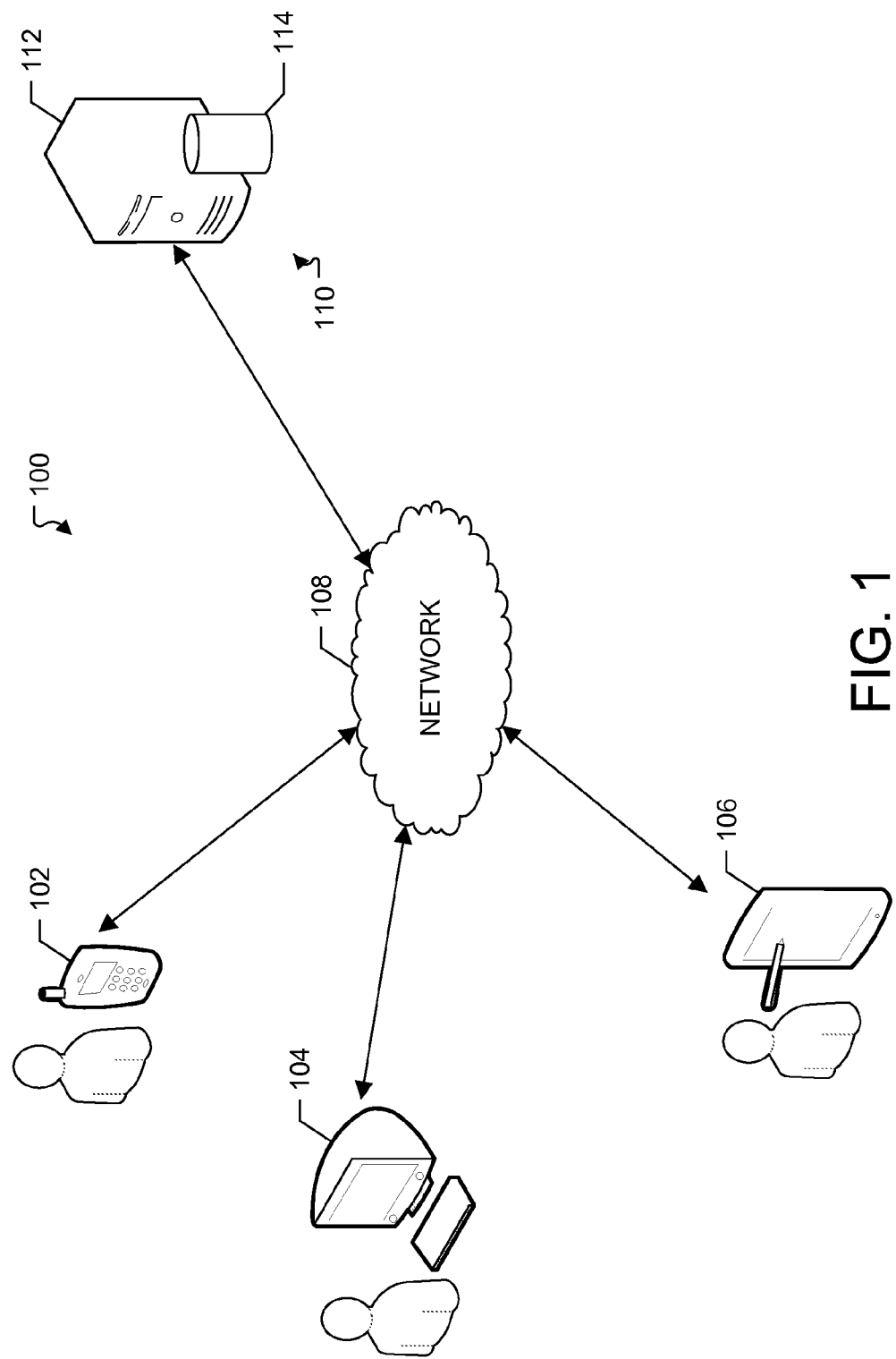
FIG. 1 illustrates an example network environment which can provide for ranking plural cookies.

FIG. 1 illustrates an example network environment which can provide for ranking plural cookies. A network environment 100 includes computing devices 102, 104 and 106 and computing system 110. Computing devices 102-106 and computing system 110 can communicate with each other through a network 108. Computing system 110 can include one or more computing devices 112 (e.g., one or more servers), respectively, and one or more computer-readable storage devices 114 (e.g., one or more databases), respectively.

Each of computing devices 102-106 can represent various forms of processing devices. Example processing devices include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices. Computing devices 102-106 and 112 may be provided access to or receive application software executed or stored on any of the other computing systems 102-106 and 112.

Computing device 112 may be any system or device having a processor, a memory, and communications capability for providing content to the electronic devices. In some example aspects, server 110 can be a single computing device, for example, a computer server. In other embodiments, server 110 can represent more than one computing device working together to perform the actions of a server computer (e.g., cloud computing). Further, computing device 112 can represent various forms of servers including, but not limited to a web server, an application server, a proxy server, a network server, or a server farm.

In some aspects, the computing devices may communicate wirelessly through a communication interface (not shown), which may include digital signal processing circuitry where necessary. The communication interface may provide for communications under various modes or protocols, for example, Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, for example, using a Bluetooth, WiFi, or other such transceiver.

In some aspects, network environment 100 can be a distributed client/server system that spans one or more networks, for example, network 108. Network 108 can be a large computer network, for example, a local area network (LAN), wide area network (WAN), the Internet, a cellular network, or a combination thereof connecting any number of mobile clients, fixed clients, and servers. Further, the network 108 can include, but is not limited to, any one or more of the following network topologies, including a bus network, a star network, a ring network, a mesh network, a star-bus network, tree or hierarchical network, and the like. In some aspects, communication between each client (e.g., computing devices 102-106) and server (e.g., server 110) can occur via a virtual private network (VPN), Secure Shell (SSH) tunnel, or other secure network connection. In some aspects, network 108 may further include a corporate network (e.g., intranet) and one or more wireless access points.

In example aspects, a computing device (any of computing devices 102-106) identifies a plurality of cookies associated with accessing web content. For example, the computing device accesses the web content from multiple servers (e.g., server 110). Domains respectively associated with the one or more of these servers can serve cookies to the computing device, and the computing device can identify these cookies. For each cookie of the identified plurality of cookies, the computing device determines one or more attributes of the cookie, and assigns a weight to the cookie based on the determined one or more attributes of the cookie. In addition, the computing device ranks the plurality of cookies relative to each other based on the their respective assigned weights. In example aspects, the computing device also provides a representation of the ranking of the plurality of cookies for display.

Figure 2:
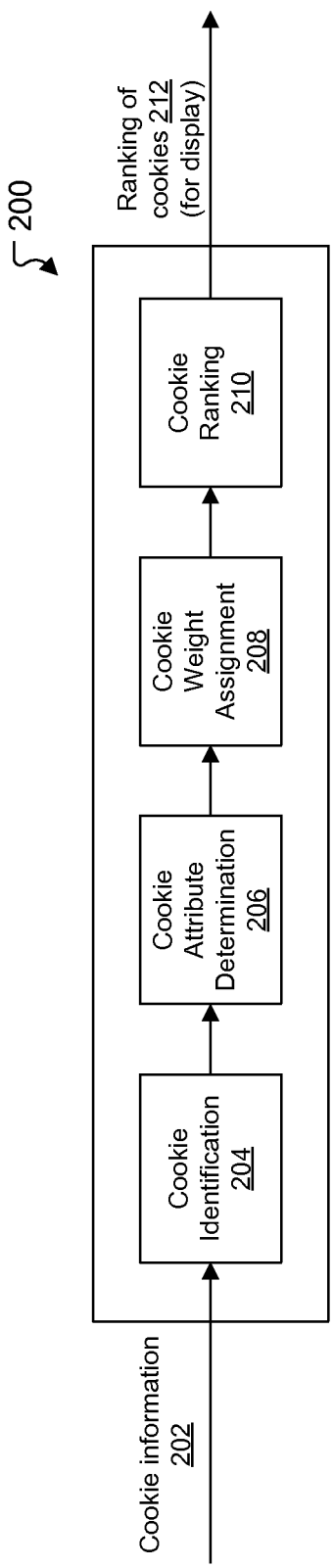
FIG. 2 is a block diagram illustrating example components of a system for ranking plural cookies.

FIG. 2 is a block diagram illustrating example components of a system for ranking plural cookies. System 200 includes a cookie identification component 204, a cookie attribute determination component 206, a cookie weight assignment component 208 and a cookie ranking component 210. System 200 can receive cookie information 202 as input, and can provide a ranking 212 of the cookies as output.

Cookie information 202 can correspond to a list of cookies stored in memory, or can correspond to any other type of information from which the identification of cookies can be determined. The cookies can correspond to a user accessing web content (e.g., based on a user profile of the user). For example, a user may log into several webpages with a particular user profile, and cookies can be served by each of corresponding domains for that user profile. Alternatively, or in addition, the cookies can correspond to a single computing device accessing web content. The computing device can be used to log into several websites, and cookies can be served by each of the corresponding domains for that computing device.

Cookie identification module 204 receives cookie information 202, and identifies a plurality of cookies associated with (e.g., associated with a user profile and/or a computing device) accessing web content. The identified plurality of cookies are provided to cookie attribute determination module 206. Cookie attribute determination module 206 determines one or more attributes for each of the plurality of cookies. The one or more attributes for each cookie can be analyzed by cookie weight assignment module 208, which assigns a weight to each of the cookies. These weights are used by cookie ranking module 210 to rank the cookies, as described later.

There are several different attributes which cookie attribute determination module 206 can determine for each of the cookies. One example of a cookie attribute is the number of first-party contexts in which the cookie is used. For example, given the domain www.xyz.com, this attribute corresponds to the number of times that www.xyz.com uses a cookie. In example aspects, cookie weight assignment module 208 may assign a lower weight (e.g., for lower ranking and lower user awareness, as described later) to cookies which are used numerous times in first-party contexts. For example, by virtue of accessing www.xyz.com, a user may have higher trust for a cookie served by www.xyz.com. Therefore, cookie weight assignment module 208 may assign such a cookie a lower weight, leading to a smaller likelihood that user will be made aware of the cookie.

On the other hand, another example of a cookie attribute is the number of third-party contexts in which the cookie is used. For example, given www.def.com, this attribute corresponds to the number of times www.def.com is embedded into another website (e.g., embedded into a website for www.xyz.com). In example aspects, cookie weight assignment module 208 may assign a higher weight (e.g., for higher ranking and higher user awareness) to cookies which are used numerous times in third-party contexts. For example, when accessing www.xyz.com, a user may have lower trust for a cookie served by another domain, such as www.def.com. Therefore, cookie weight assignment module 208 may assign such a cookie a higher weight, leading to a higher likelihood that the user will be made aware of the cookie.

In another example, cookie attribute determination module 206 can determine an attribute for the number of different contexts in which the cookie is used. In example aspects, cookie weight assignment module 208 may assign a higher weight (e.g., for higher ranking and higher user awareness) to cookies which are used in a large number (e.g., higher than a preset threshold) of contexts. For example, a user may have lower trust for such a cookie, and cookie weight assignment module 208 may assign this cookie a higher weight, leading to a higher likelihood that the user will be made aware of the cookie.

In another example, cookie attribute determination module 206 can determine an attribute for the number of network requests in which the cookie is used. In example aspects, cookie weight assignment module 208 may assign a higher weight (e.g., for higher ranking and higher user awareness) to cookies which are used in a high number of network requests, and a lower weight to cookies which are used in a low number of network requests. For example, a user may have lower trust for a cookie served in a high number of network requests, and cookie weight assignment module 208 may assign such a cookie a higher weight, leading to a higher likelihood that the user will be made aware of the cookie.

In another example, cookie attribute determination module 206 can determine an attribute for whether the cookie is used in context with user submission of a login form. For example, provided that the domain www.wyz.com serves a cookie in association with the user submission of a login form, www.xyz.com may know the identity of the user and associate that identify with the cookie. Thus, in example aspects, cookie weight assignment module 208 may assign a higher weight (e.g., for higher ranking and higher user awareness) to cookies associated with a user logging in (e.g., with a user ID, password, full name, etc.) to a webpage. A user may have lower trust for a cookie served in association with user login information, and cookie weight assignment module 208 may assign such a cookie a higher weight, leading to a higher likelihood that the user will be made aware of the cookie.

In another example, cookie attribute determination module 206 can determine an attribute for whether the cookie is used in a first-party context for websites accessed by the user for at least a threshold frequency (e.g., how often the user accesses the website). In example aspects, cookie weight assignment module 208 may assign a lower weight (e.g., for lower ranking and lower user awareness) to cookies which are used in a first-party context for websites frequently accessed by the user. For example, a user may have higher trust for such a cookie, and cookie weight assignment module 208 may assign this cookie a lower weight, leading to a lower likelihood that the user will be made aware of the cookie.

Alternatively, or in addition, cookie attribute determination module 206 can determine an attribute for whether the cookie is used in a first-party context for websites accessed by the user at least a threshold time duration (e.g., how long the user views the website). In example aspects, cookie weight assignment module 208 may assign a lower weight (e.g., for lower ranking and lower user awareness) to cookies which are used in a first-party context for websites accessed by the user for long time durations. For example, a user may have higher trust for such a cookie, and cookie weight assignment module 208 may assign this cookie a lower weight, leading to a lower likelihood that the user will be made aware of the cookie.

In another example, cookie attribute determination module 206 can determine an attribute for a page rank of a webpage from which the cookie is served. In example aspects, cookie weight assignment module 208 may assign a lower weight (e.g., for lower ranking and lower user awareness) to cookies which are served from a domain corresponding to a high-ranking webpage. For example, a user may have higher trust for such a cookie, and cookie weight assignment module 208 may assign this cookie a lower weight, leading to a lower likelihood that the user will be made aware of the cookie.

In another example, cookie attribute determination module 206 can determine an attribute that scores the Terms of Service of a domain from which a cookie is served. In example aspects, cookie weight assignment module 208 may assign a weight (e.g., for ranking and user awareness) based on the Terms of Service for the corresponding webpage. For example, a user's level of trust may be based on the provided Terms of Service, and cookie weight assignment module 208 may assign cookie weight accordingly.

The above-mentioned attributes correspond to examples of attributes. It should be noted that other attributes can be determined by cookie attribute determination module 206, and these cookies can be weighted by cookie weight assignment module 208. In assigning weights to cookies, cookie weight assignment module 208 can analyze multiple attributes for each cookie, and assign respective weights accordingly. As such, it is possible for a cookie to be weighted high in some aspects (e.g., if associated with user login information) and lower in other aspects (e.g., for frequently-visited first-party websites). However, cookie weight assignment module 208 can assign a single weight to each cookie based on a summation of all the weighted attributes for each cookie.

In example aspects, users may be presented with a control for how to weight cookies. In this regard, a web browser (e.g., or other application for accessing web content) can include an interface for a user to specify how particular cookie attributes should be weighted. Using the interface, a user can indicate a level of trust that the user has for cookies, based on each individual attribute. For example, if a user tends to trust cookies associated with login information, the user can specify to a high level of trust (or lower weight) for that attribute. As such, default weight values can be preassigned for attributes, and these default values can be reassigned by the user via the interface.

In example aspects, the one or more determined attributes for each cookie can be aggregated across plural browsers for the cookie. For example, such aggregation can occur for a user using multiple devices with the same user profile. In another example, such aggregation can occur across multiple devices and multiple users, so as to create an affect of weighting cookies across multiple users.

Cookie ranking module 210 can rank the cookies relative to one another based on the weights assigned by cookie weight assignment module 208. As noted above, the higher-ranked cookies correspond to those cookies which the user should be made more aware of. On the other hand, the lower-ranked cookies correspond to those cookies which the user may not need to be made aware of. As described later with reference to FIG. 3, cookies which the user should be made aware of can be identified as "priority" cookies, and cookies which the user does not need to be made aware of can be identified as "other" cookies. In the example of FIG. 2, the output of cookie ranking module 210 is the ranking 212 of cookies.

Various techniques can be used for ranking the cookies. One example technique is the use of a Bayes classifier on the attributes/weights assigned to each of the cookies. For example, a Bayes classifier can be used to determine whether a cookie should be identified as a "priority" cookie or as "other." In example aspects, the Bayes classifier can be implemented in conjunction with cookie weight assignment module 208 and cookie ranking module 210, using the attributes provided from cookie attribute determination module 206. In this regard, while FIG. 2 illustrates modules 206 and 208 as separate modules, in example aspects, modules 206 and 208 may correspond to a single module in which the ranking algorithm is performed. Of course, a Bayes classifier is one example of ranking cookies based on weights/rankings, and other algorithms (or classifiers) can be used instead.

Figure 3:
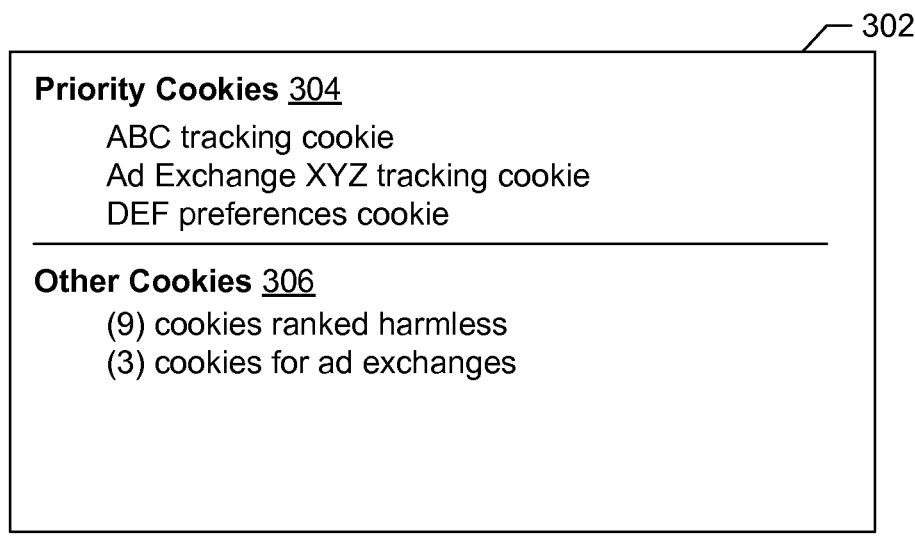
FIG. 3 illustrates an example user interface for displaying cookies which have been ranked.

FIG. 3 illustrates an example user interface for displaying cookies which have been ranked. User interface 302 includes a set of priority cookies 304, and a set of other cookies 306. Priority cookies 304 can correspond to those cookies which a user should be made aware of. As noted above, a browser (or other application accessing web content) running on a computing device (e.g., any of computing devices 102-106) can assign weights/rankings for cookies based on attributes of the cookies.

Based on these weights/rankings, a determination can be made as to whether a cookie should be classified as a priority cookie (e.g., included within priority cookies 304) which the user should be made aware of, or as another cookie (e.g., included within other cookies 306) which the user may not need to be made aware of. For example, a threshold weight/ranking can be used to determine whether a cookie should be classified as a priority cookie or as another cookie.

In the example of FIG. 3, priority cookies 304 includes 3 cookies, namely "ABC tracking cookie," "Ad Exchange XYZ tracking cookie" and "DEF preferences cookie." These cookies were determined to meet the threshold for being a priority cookie which the user should be made aware of. On the other hand, other cookies 306 identifies that 9 other cookies have been ranked as harmless, and that 3 other cookies are for ad exchanges. These cookies did not meet the threshold for cookies which the user should be made aware of.

Although not shown in the example of FIG. 3, further graphical components/interfaces can be provided for individually listing out the cookies included in other cookies 306. For example, a user can use such graphical components/interfaces to expand and individually provide a description for each of the "(9) cookies ranked harmless" and/or the "(3) cookies for ad exchanges" included in other cookies 306. In example aspects, this additional information can be provided as hover content.

In addition, user interface 302 can include graphical components/interfaces for providing additional information for cookies. This information can include, but is not limited to, any of the information used in weighting/ranking the cookie. In example aspects, this additional information can be provided as hover content.

Furthermore, user interface can include graphical components/interfaces for blocking identified cookies. For example, a user can decide to block a specific cookie being served by a domain, so that information (e.g., preferences, login information) is not locally stored on the web browser, or other application, running on a computing device (e.g., any of computing devices 102-106) in association with the domain serving the cookie. Alternatively, or in addition, a graphical component/interface can be provided for blocking all cookies from a particular domain.

It should be noted that the subject disclosure is not limited to the sections of priority cookies 304 and other cookies 306, and that other sections for classifying cookies can be used. For example, multiple sections of cookies can be displayed (e.g., either individually as in priority cookies 304, or grouped as in other cookies 306) based on the rankings/weights assigned to the respective cookies. Alternatively, or in addition, user interface 302 can display the ranking (or weight) for each cookie as an annotation of the cookie/domain (e.g., as hover content).

Figure 4:
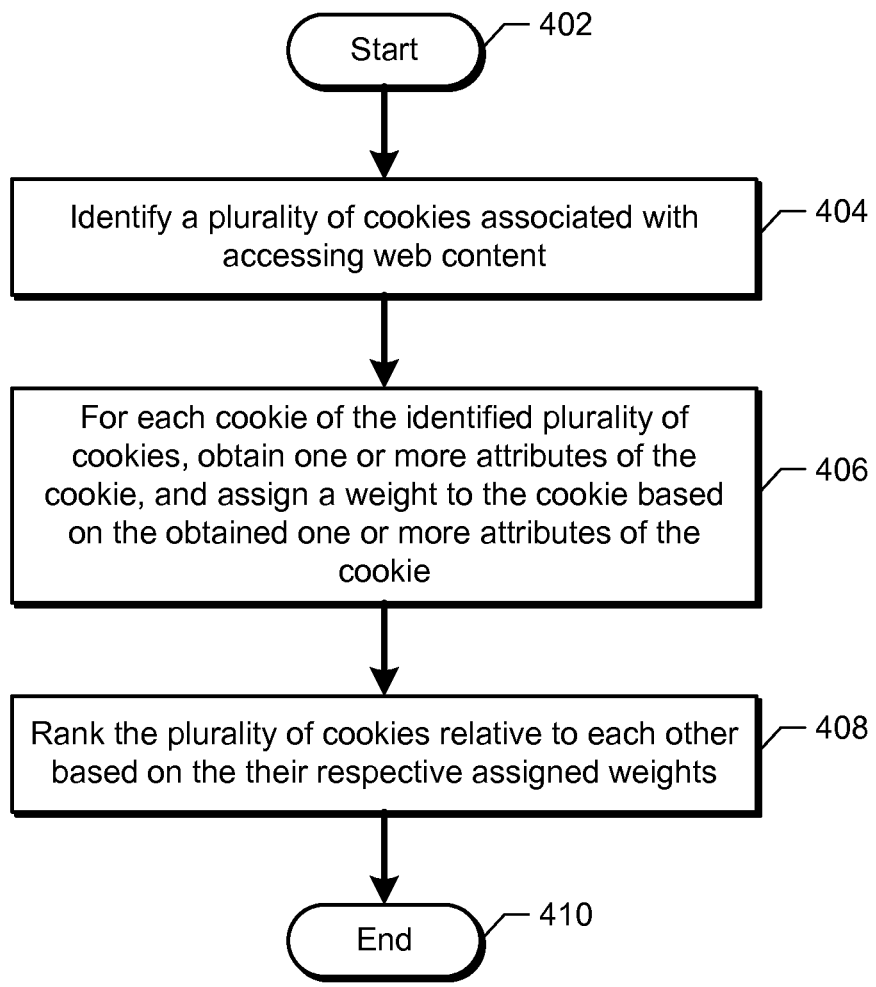
FIG. 4 illustrates an example process by which cookies are ranked.

FIG. 4 illustrates an example process by which cookies are ranked. Following start block 402, a plurality of cookies associated with accessing web content is identified at step 404. The plurality of cookies can be identified in association with a user profile. Alternatively, or in addition, the plurality of cookies can be identified in association with an electronic device (e.g., any of computing devices 102-106).

At step 406, for each cookie of the identified plurality of cookies, one or more attributes of the cookie are determined, and a weight is assigned to the cookie based on the determined one or more attributes of the cookie. The one or more attributes can be aggregated across plural browsers for the cookie.

The one or more attributes can include an attribute for a number of first-party contexts in which the cookie is used. The one or more attributes can include an attribute for a number of third-party contexts in which the cookie is used. The one or more attributes can include an attribute for a number of network requests in which the cookie is used. The one or more attributes can include an attribute for whether the cookie is used in context with user submission of a login form.

The one or more attributes can include an attribute for whether the cookie is used in a first-party context for websites accessed for at least a threshold number of times. The one or more attributes can include an attribute for whether the cookie is used in a first-party context for websites accessed for at least a threshold time duration.

The one or more attributes can include an attribute for a page rank of a webpage from which the cookie is served. The one or more attributes can include an attribute for a number of different contexts in which the cookie is used. The one or more attributes can include an attribute that scores the Terms of Service of a domain from which the cookie is served.

At step 408, the plurality of cookies are ranked relative to each other based on the their respective assigned weights. A representation of the ranking of the plurality of cookies can be provided for display. The process then ends at end block 410.

FIG. 5 conceptually illustrates an example electronic system with which some implementations of the subject technology can be implemented. Electronic system 500 can be a computer, phone, PDA, or any other sort of electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (for example, a magnetic or optical disk and its corresponding disk drive) as permanent storage device 502.

Other implementations use a removable storage device (for example, a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, or ROM 510. For example, the various memory units include instructions for ranking plural cookies in accordance with some implementations. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, for example, cathode ray tubes (CRT) or liquid crystal displays (LCD). Some implementations include devices, for example, a touchscreen that functions as both input and output devices.

Finally, as shown in FIG. 5, bus 508 also couples electronic system 500 to a network (not shown) through a network interface 516. In this manner, the computer can be a part of a network of computers (for example, a local area network ("LAN"), a wide area network ("WAN"), or an Intranet, or a network of networks, for example, the Internet. Any or all components of electronic system 500 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A machine-implemented method of ranking plural cookies, the method comprising:
    identifying a plurality of cookies associated with accessing web content by a user;
    for each cookie of the identified plurality of cookies, determining one or more attributes of the cookie, and assigning a weight to the cookie based on the determined one or more attributes of the cookie;
    ranking the plurality of cookies relative to each other based on the their respective assigned weights;
    identifying, based on the ranking, one or more priority cookies from among the plurality of cookies, the one or more priority cookies corresponding to potentially harmful cookies of which the user should be notified, wherein the potentially harmful cookies are ranked higher based on a preset threshold; and
    providing for notifying the user of the identified one or more priority cookies.

2. The method of claim 1, wherein the one or more attributes comprise an attribute for a number of first-party contexts in which the cookie is used.

3. The method of claim 1, wherein the one or more attributes comprise an attribute for a number of third-party contexts in which the cookie is used.

4. The method of claim 1, wherein the one or more attributes comprise an attribute for a number of network requests in which the cookie is used.

5. The method of claim 1, wherein the one or more attributes comprise an attribute for whether the cookie is used in context with user submission of a login form.

6. The method of claim 1, wherein the one or more attributes comprise an attribute for whether the cookie is used in a first-party context for websites accessed for at least a threshold number of times.

7. The method of claim 1, wherein the one or more attributes comprise an attribute for whether the cookie is used in a first-party context for websites accessed for at least a threshold time duration.

8. The method of claim 1, wherein the one or more attributes comprise an attribute for a page rank of a webpage from which the cookie is served.

9. The method of claim 1, wherein the one or more attributes are aggregated across plural browsers for the cookie.

10. The method of claim 1, wherein the one or more attributes comprise an attribute for a number of different contexts in which the cookie is used.

11. The method of claim 1, wherein the one or more attributes comprise an attribute that scores the Terms of Service of a domain from which the cookie is served.

12. The method of claim 1, further comprising:
providing a representation of the ranking of the plurality of cookies for display.

13. The method of claim 1, wherein the plurality of cookies are identified in association with a user profile of the user.

14. The method of claim 1, wherein the plurality of cookies are identified in association with an electronic device associated with the user.

15. A system for ranking plural cookies, the system comprising:
one or more processors; and
a machine-readable medium comprising instructions stored therein, which when executed by the processors, cause the processors to perform operations comprising:
identifying a plurality of cookies associated with a user accessing web content;
for each cookie of the identified plurality of cookies, determining one or more attributes of the cookie, and assigning a weight to the cookie based on the determined one or more attributes of the cookie;
ranking the plurality of cookies relative to each other based on the their respective assigned weights;
identifying, based on the ranking, one or more priority cookies from among the plurality of cookies, the one or more priority cookies corresponding to potentially harmful cookies of which the user should be notified, wherein the potentially harmful cookies are ranked higher based on a preset threshold; and
providing for notifying the user of the identified one or more priority cookies.

16. The system of claim 15, wherein the one or more attributes comprise an attribute for a number of first-party contexts in which the cookie is used.

17. The system of claim 15, wherein the one or more attributes comprise an attribute for a number of third-party contexts in which the cookie is used.

18. The system of claim 15, wherein the one or more attributes comprise an attribute for a number of network requests in which the cookie is used.

19. The system of claim 15, wherein the one or more attributes comprise an attribute for whether the cookie is used in context with user submission of a login form.

20. A non-transitory machine-readable medium comprising instructions stored therein, which when executed by a system, cause the system to perform operations comprising:
identifying a plurality of cookies associated with a computing device accessing web content;
for each cookie of the identified plurality of cookies, determining one or more attributes of the cookie, and assigning a weight to the cookie based on the determined one or more attributes of the cookie;
ranking the plurality of cookies relative to each other based on the their respective assigned weights;
identifying, based on the ranking, one or more priority cookies from among the plurality of cookies, the one or more priority cookies corresponding to potentially cookies of which the user should be notified, wherein the potentially harmful cookies are ranked higher based on a preset threshold; and
providing for notifying the user of the identified one or more priority cookies.

* * * * *

UNITED STATES PATENT AND TRADEMARK OFFICE
CERTIFICATE OF CORRECTION

PATENT NO. : 9,160,613 B1
APPLICATION NO. : 13/772284
DATED : October 13, 2015
INVENTOR(S) : Dominic Pascal Battré et al.

Page 1 of 1

It is certified that error appears in the above-identified patent and that said Letters Patent is hereby corrected as shown below:

In the Claims

Claim 20, Column 14, Line 25, "potentially" should read --potentially harmful--.

Signed and Sealed this
Thirteenth Day of August, 2019

Andrei Iancu
*Director of the United States Patent and Trademark Office*